United States Patent
McCullough et al.

(10) Patent No.: US 7,114,823 B2
(45) Date of Patent: Oct. 3, 2006

(54) ILLUMINATION SYSTEMS AND METHODS OF USE

(76) Inventors: Wayne McCullough, 276 W. 300 N., Greenfield, IN (US) 46140; Bryan Magee, 1102 S. Franklin Rd., Indianapolis, IN (US) 46239; Matthew Lykins, 197 Julia St., Franklin, IN (US) 46131

( * ) Notice: Subject to any disclaimer, the term of this patent is extended or adjusted under 35 U.S.C. 154(b) by 105 days.

(21) Appl. No.: 10/622,600

(22) Filed: Jul. 18, 2003

(65) Prior Publication Data
US 2004/0252487 A1    Dec. 16, 2004

(51) Int. Cl.
*F21V 21/084* (2006.01)
*H04R 1/10* (2006.01)
*H04R 31/00* (2006.01)

(52) U.S. Cl. .......................... 362/105; 362/86; 362/231; 362/800; 381/74; 381/370

(58) Field of Classification Search ............ 362/86–88, 362/105, 106, 184, 231, 800; 381/74, 370–384
See application file for complete search history.

(56) References Cited

U.S. PATENT DOCUMENTS

| | | | | |
|---|---|---|---|---|
| 4,618,917 A | * | 10/1986 | Lee et al. .................... 362/88 |
| 4,969,069 A | * | 11/1990 | Eichost ....................... 362/105 |
| 5,604,813 A | * | 2/1997 | Evans et al. ................ 381/71.6 |
| 5,675,658 A | * | 10/1997 | Brittain ....................... 381/370 |
| 5,751,825 A | * | 5/1998 | Myers et al. .................. 381/74 |
| 6,290,368 B1 | * | 9/2001 | Lehrer ......................... 362/105 |
| 6,367,943 B1 | * | 4/2002 | Tocci et al. .................. 362/103 |
| 6,733,150 B1 | * | 5/2004 | Hanley ........................ 362/105 |
| 2001/0021108 A1 | * | 9/2001 | Shimada et al. ............ 362/103 |
| 2002/0021573 A1 | * | 2/2002 | Zhang ......................... 362/555 |
| 2002/0027777 A1 | * | 3/2002 | Takasu ....................... 362/105 |
| 2003/0202341 A1 | * | 10/2003 | McClanahan ............... 362/105 |

* cited by examiner

*Primary Examiner*—Alan Cariaso
(74) *Attorney, Agent, or Firm*—Woodard, Emhardt, Moriarty, McNett & Henry LLP

(57) ABSTRACT

The present invention provides a high-intensity LED as a light source for use in hands-free illumination devices. In one embodiment, one or more high-intensity LEDs are incorporated in, or added to, headgear, such as an aircraft headset. The LEDs may be powered by a battery, an external power source, or both. Also provided is a kit and method of installation for retrofitting existing headgear with LEDs.

18 Claims, 8 Drawing Sheets

ILLUMINATION SYSTEMS AND METHODS OF USE

FIELD OF THE INVENTION

The invention is directed generally to portable illumination systems, and more particularly to a hands-free/body-mounted light emitting diode ("LED") as a light source.

BACKGROUND OF THE INVENTION

Conventional portable illumination systems, such as flashlights, include an incandescent light bulb and conventional drycell batteries enclosed in a housing typically constructed of a body section and a head section. Though portable, illumination systems of this type are often bulky and cumbersome, and thus often are not carried on the person. This presents a problem when the need for illumination arises unexpectedly, such as during a power failure at night, and no portable illumination system is readily available. The problem is exacerbated when, for instance, the person does not have a hand available to search for, aim and operate a conventional flashlight.

There have been some variations on portable, hands-free illumination systems. Underground coal miners have long mounted large conventional incandescent lights with large, heavy battery packs to the front of hard hats, allowing them to work with both hands while the light on the hat illuminated the area in front of them. U.S. Pat. No. 3,032,647 to Wansky provides an example of a hat-mounted light. U.S. Pat. No. 4,616,297 to Liu also provides an example of a hands-free flashlight, which mounts conventional incandescent light bulbs and conventional drycell batteries to a bulky frame to be worn like spectacles. U.S. Pat. Nos. 5,217,294 to Liston and U.S. Pat. No. 5,412,545 to Rising describe hands-free operation of a conventional flashlight by strapping the flashlight to the user's head.

While any of these devices, if worn by a user, might function as a hands-free illumination device, such devices are even more bulky and cumbersome than conventional flashlights. Moreover, such devices are not suitable for use in conjunction with other headgear.

Conventional hands-free portable illumination systems are bulky primarily because they use incandescent light bulbs, which suffer from poor efficiency in converting electrical power into radiated visible light. Most of the electrical energy incandescent light bulbs consume is wasted in the form of heat energy, while less than 7% of the energy they consume is typically radiated as visible light. This has severe negative consequences for portable illuminator applications, such as hands-free illumination devices, where the amount of power available for lighting systems is limited. In these applications, electrical power is usually provided by batteries which are periodically replaced, as in the case of a flashlight. Such a mechanism for providing electrical power is inherently bulky, heavy, and/or expensive due at least in part to poor power-conversion efficiency in generating visible light.

As already noted, incandescent lamps generate large amounts of heat for an equivalent amount of generated light as compared to other sources. This results in very high bulb-wall temperatures typically in excess of 250 degrees Celsius and large heat accumulations which must be dissipated properly by radiation, convection, or conduction to prevent damage or destruction to the illuminator support members, enclosure, optics or to other nearby components. Providing room for the necessary heat dissipation requires additional bulkiness. This high heat signature of common incandescent light sources in illuminators is particularly problematic for hands-free light sources, where the light source is in close proximity to the user's body, for instance, the user's head.

Incandescent light bulbs, or lamps, are also disadvantageous because they are fragile and have a short life. Even in stable environments incandescent lamps must be replaced frequently, sometimes at great inconvenience, hazard, and/or expense. In addition to their short life, incandescent lamps are susceptible to damage from mechanical shock and/or vibration. Such occurrences can damage the delicate filaments from which incandescent light emissions originate, or can damage the surrounding glass casing, which can result in air entering the casing and quick burning out of the filament. Incandescent lamps can also be easily damaged by exposure to liquid moisture, due to the thermo-mechanical stress associated with contact between the hot glass bulb wall and cooler fluids. Thus, incorporating an incandescent lamp into a hands-free illumination device requires substantial or extreme measures to protect the light bulb from shock, vibration, moisture and other hazards while still allowing for removal of the bulb or light fixture when it burns out, is permanently damaged or otherwise loses power.

Incandescent light bulbs or lamps also exhibit certain electrical characteristics which make them inherently difficult to incorporate in small, lightweight applications, like hands-free illumination devices. For instance, when an incandescent light source is first energized by a voltage source, there is an initial surge of current which flows into the filament. This inrush current, which is typically 12 to 20 times the normal operating current, limits the lifetime of the lamp thus further amplifying the need for an illuminator structure which allows for frequent replacement. Inrush current also necessitates unusual consideration when designing supporting electrical circuits which contain them. Fuses, relays, mechanical or electronic switches, wire harnesses, and connectors electrically connected to such lamps must be capable of repeatedly carrying this extreme transient.

In addition, the voltage-current (V-I) characteristic of incandescent lamps is notoriously non-linear, as are each of the relationships between light output and voltage, current, or power. The luminous intensity, color temperature, and service life of incandescent lamps varies exponentially as a function of applied current or voltage. This sensitivity to power source variation makes electronic control of incandescent lamps a particularly difficult problem. They are further susceptible to significant reliability and field service life degradation when subjected continuously to DC electrical power, pulse-width modulated DC power, simple on/off switching of any sort, or any over-voltage conditions, however minor. Incandescent lamps also possess significant inductance which, when combined with their relatively high current load, complicates electronic switching and control greatly due to inductive resonant voltage transients.

SUMMARY OF THE INVENTION

A light emitting diode ("LED") is provided as a light source for use in hands-free illumination devices. In one embodiment, a hands-free illuminator using LED technology is provided in the form of an aircraft headset, such as a pilot's headset. In another embodiment, a kit is provided to convert existing headgear, such as an aircraft headset, into a hands-free illumination device.

Unlike conventional incandescent light bulbs/lamps, LEDs are highly efficient, in that most of the power consumed by an LED is converted into visible light. The efficiency of LEDs allows them to be incorporated into compact, streamlined designs with smaller and lighter batteries or other power sources. Further, LEDs are highly shock resistant and therefore provide significant advantages over incandescent and fluorescent bulbs, rendering LEDs ideal for critical applications, such as pilot-mounted aircraft cockpit illumination. LEDs possess operating lifetimes from 200,000 hours to 1,000,000 hours, as compared to the typical 1,000 to 2,000 hours for incandescent lamps. Finally, LEDs avoid the transience and inductance problems associated with incandescent lamps, allowing LEDs to be incorporated into various structures using simple circuitry.

Until recently, LEDs did not produce enough light to illuminate another surface. Thus, most LEDs were used as display devices, for example, on/off indicators, etc. These uses still dominate the LED market, but recent advances in LED materials, design and manufacturing have resulted in significant increases in LED luminous efficacy and, in their most recent commercial forms, exhibit a higher luminous efficacy than incandescent lights. Thus, the latest LEDs can provide as much illumination as conventional incandescent lamps.

In one embodiment of the invention, an apparatus is provided including one or more high-intensity LEDs attached to headgear, such as an aircraft headset. Other embodiments could provide one or more high-intensity LEDs along with spectacles, hat, helmet, headband or the like. In the headset embodiment, the LEDs may receive power from one or more batteries integrated with the headset, and/or from a power source external to the headset. In the case of an external power source, electrical power may be communicated through the existing headset power and/or communication cables that normally include an adaptor for connection to a jack for transmitting audio signals or power, or through other means, including dedicated wires. The LEDs may be controlled by a switch or switches (e.g., integrated with the headset), such that a user (e.g., a pilot) can cause the LEDs to illuminate by actuating the switch. The LEDs are preferably oriented in or on the headset to direct the LEDs' luminance in the direction the headset wearer is looking, to illuminate the area of interest (e.g., cockpit instruments, dials or gauges). LEDs of various colors may be used, to produce, for instance, white, blue or red light. It is known that red light is optimal under some conditions, such as for example nighttime vision.

In one version of this embodiment, the LEDs and/or switches are incorporated into a conventional pilot headset. In another version of this embodiment, the LEDs and/or switches are part of a separate device that can be attached to a conventional pilot headset. In the version utilizing a separate device, the power source, for instance a battery, is preferably, but not necessarily, incorporated into the separate device.

In another embodiment of the invention, a kit is provided to retrofit existing headgear, such as pilot headsets and the like, with LEDs. Such a kit may include one or more of any or all of the following: a high-intensity LED; electrical wire or other conductor; grommet; a wire shield; a switch; a rubber boot; a battery holder; a battery; a power pack; a template; tape; a drill bit; a pin clamp; a fuse; a fuse holder; a zener diode; screws and/or other types of fasteners; epoxy; a clip and instructions. Any or all of the electrical components and/or electronics may be provided as part of a pre-assembled or partially assembled circuit. A method of using/installing the kit is also provided.

In yet another embodiment a system and method is provided to combine what is essentially a compact, light-weight LED flashlight with existing headgear, such as headsets, spectacles, hats, helmets, and headbands, to illuminate the headgear wearer's area of interest.

DETAILED DESCRIPTION OF PREFERRED EMBODIMENTS

Figure 1:
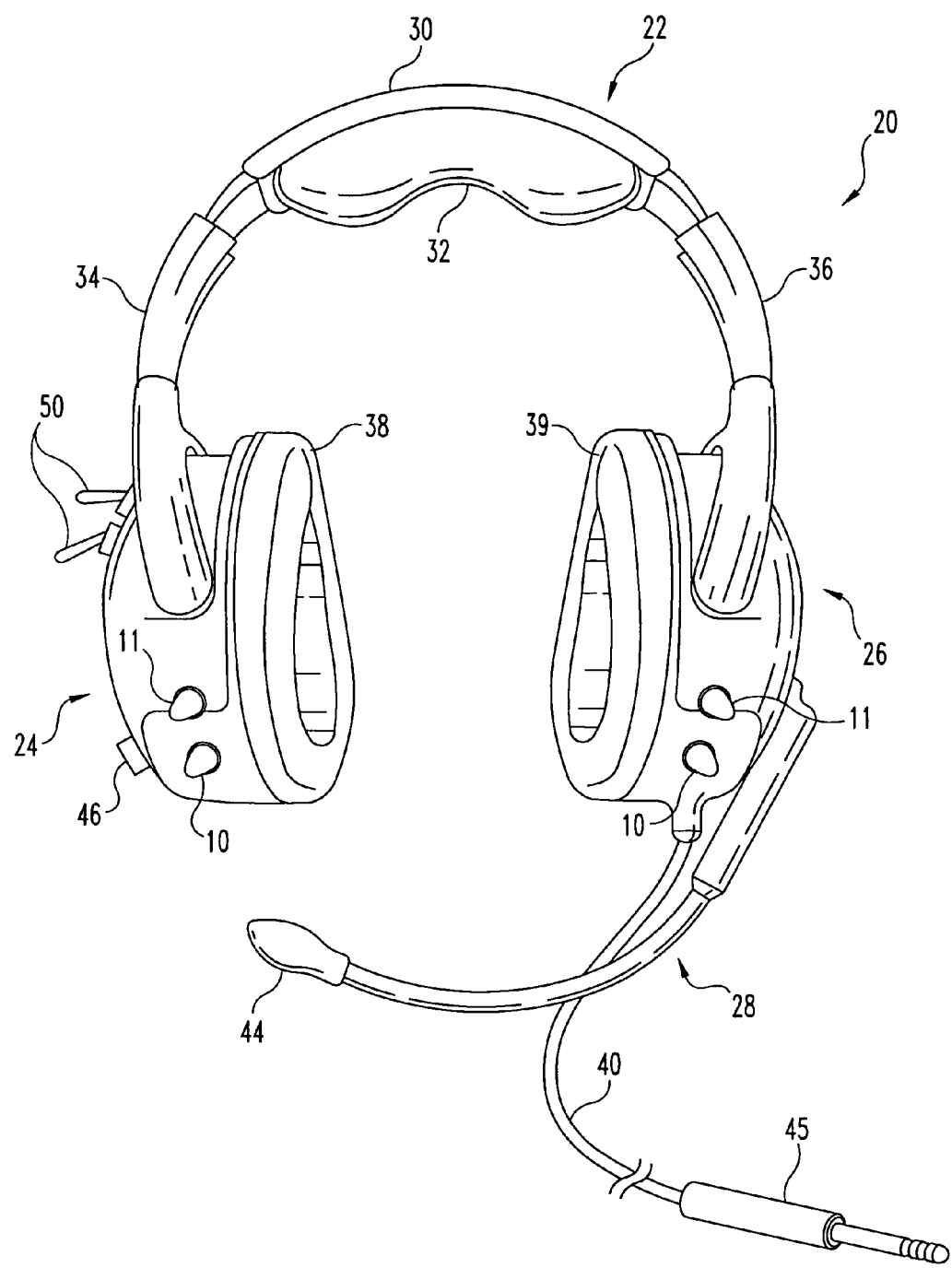
FIG. 1 is a front elevation view of a headset for a pilot incorporating LEDs and switches according to one embodiment of the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein, are herein contemplated as would normally occur to one skilled in the art to which the invention relates.

The present invention is directed to hands-free illumination devices using LEDs, and is described below primarily in the context of illumination devices used in conjunction with headgear, in particular aircraft headsets. However, other embodiments covered by the invention simply substitute for aircraft headsets any other body-mounted object, including headgear such as: spectacle-like frames, including safety glasses; hats, including hardhats; helmets; and headbands. Hereafter the invention is described with respect to a preferred embodiment, aircraft headsets.

Referring now to FIG. 1, an embodiment of an aircraft headset 20 is shown. Headset 20 includes a first set of LEDs 10, a second set of LEDs 11 and switches 50. The illustrated embodiment of headset 20 includes a headband 22, spaced apart ear cups 24, 26, and a microphone boom 28. Headband 22 includes a head element 30, having a head cushion 32 carried on the bottom side thereof. Ear cup supports 34, 36 are moveable on head element 30, to provide adjustment for ear cups 24, 26, respectively. Each ear cup 24, 26, is pivotally mounted on its respective ear cup support 34, 36, and includes an ear cup, or acoustic, seal 38, 39. A cord 40 extends from ear cup 26 and provides an electrical connection to LEDs 10, 11 through switches 50; to speakers (not shown) mounted in ear cups 24, 26; and to a microphone pickup element (not shown) carried in a microphone housing 44, located at one end of microphone boom 28. As will be appreciated from the connection to a microphone pickup element and speakers, cord 40 may also be connected to an adaptor 45 for connection to a jack for transmission and reception of audio signals. A volume control knob 46 may be located on ear cup 24 to control the volume of the sound produced by the acoustic transducers located in each ear cup 24, 26, as is known in the art.

Figure 2:
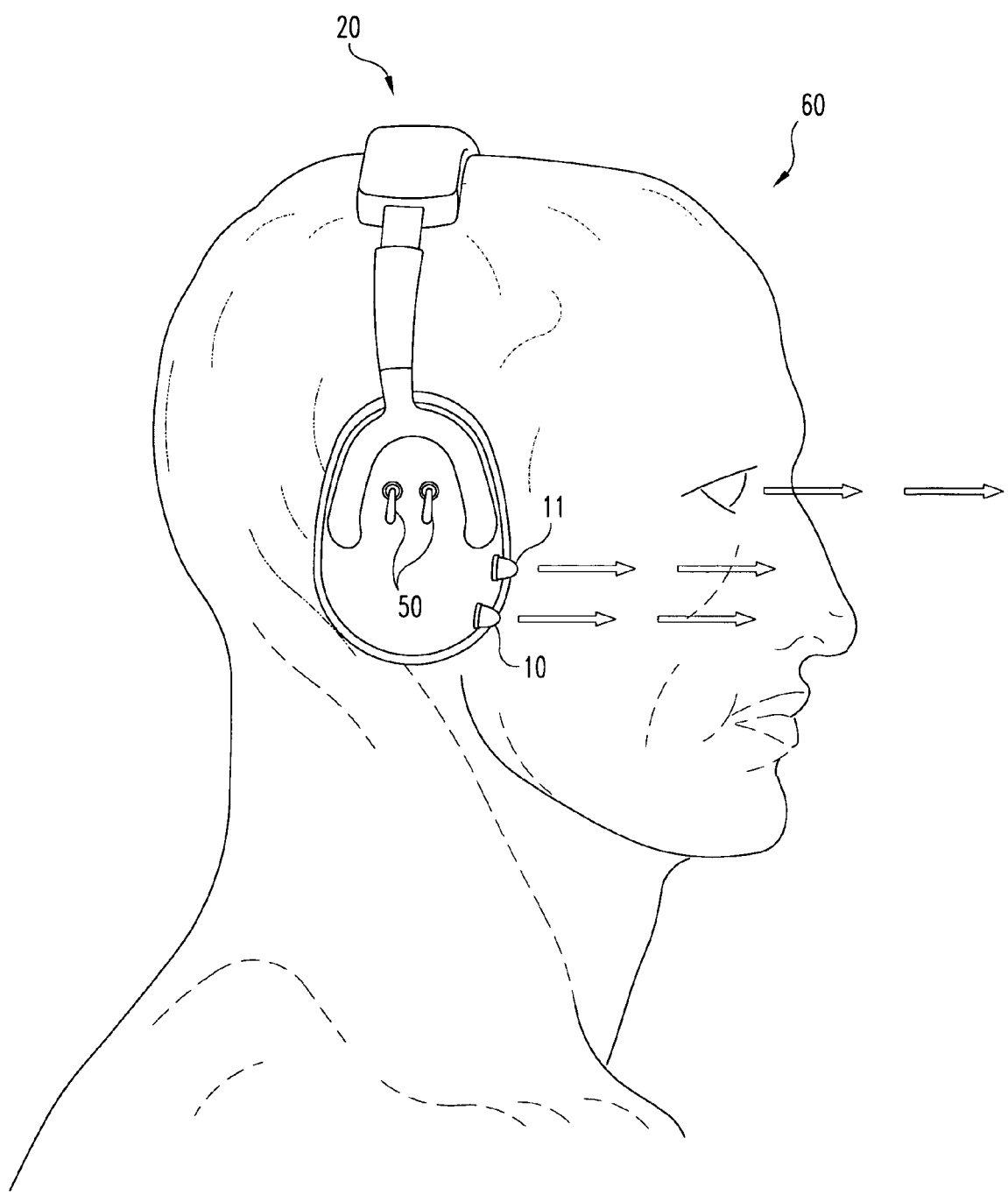
FIG. 2 is a left elevation view of a headset incorporating LEDs and toggle switches according to one embodiment of the invention, with a user wearing the headset.
Figure 3:
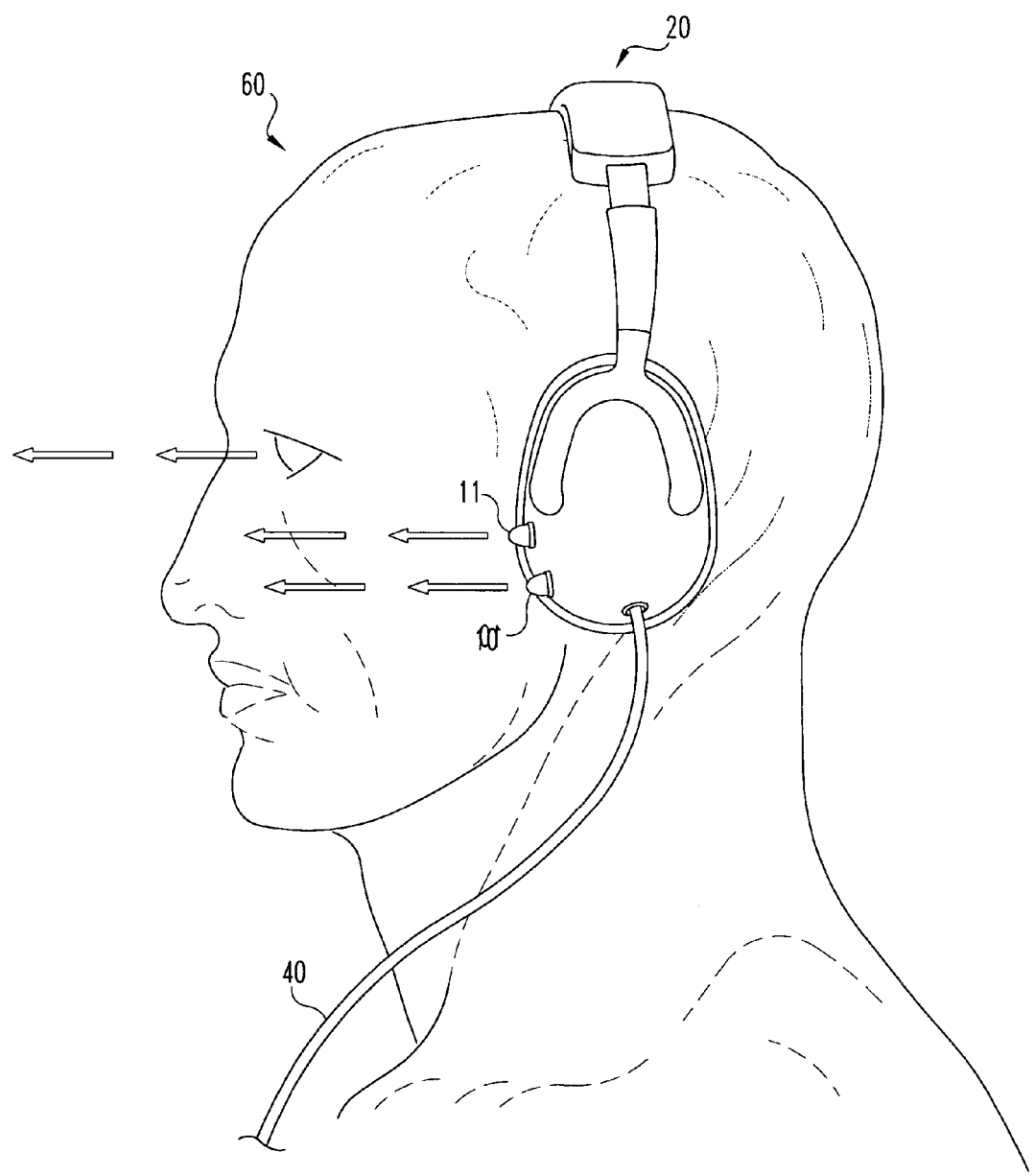
FIG. 3 is a right elevation view of a headset incorporating LEDs according to one embodiment of the invention, with a user wearing the headset.

Turning to FIGS. 2 and 3, headset 20 is shown on user 60. Headset 20 is shown illuminating the area of interest to the headset user/wearer 60, by directing light from LEDs 10, 11 generally in the same direction the headset wearer 60 is looking (as indicated by dashed lines in FIGS. 2 and 3). For clarity, FIG. 3 omits microphone boom 28.

Two toggle-type switches 50 are depicted in the embodiment shown in FIG. 2. In this embodiment, one switch 50 turns on and off first set of LEDs 10, and a second switch 50 turns on and off second set of LEDs 11. The embodiment shown in FIG. 2 shows two LEDs 10 and two LEDs 11. One LED 10 and one LED 11 can be used, or more than two of each can be used, or differing numbers of each. In a preferred embodiment, a first set of LEDs 10 generate white light, while a second set of LEDs 11 generate red light. In that embodiment the white LED is preferably a 3.6 volt, 20 milli-amp LED with a luminous intensity of 1,100 millicandelas (mcd) (a candela (1,000 mcd) is the amount of light that shines through a 1/16-inch square centimeter hole in one side of a ceramic box that has been heated to 1,772° C.). The red LED is preferably a 1.7 volt, 20 milli-amp LED with a luminous intensity of 3,000 mcd. Any LED 10, 11 can be used that produces visible light in sufficient intensity to enhance the user's 60 vision. Further, if only a single set of one or more LEDs is provided (e.g. only LEDs 10), then only one toggle or other switch needs to be included for turning on and off such LEDs.

Figure 4:
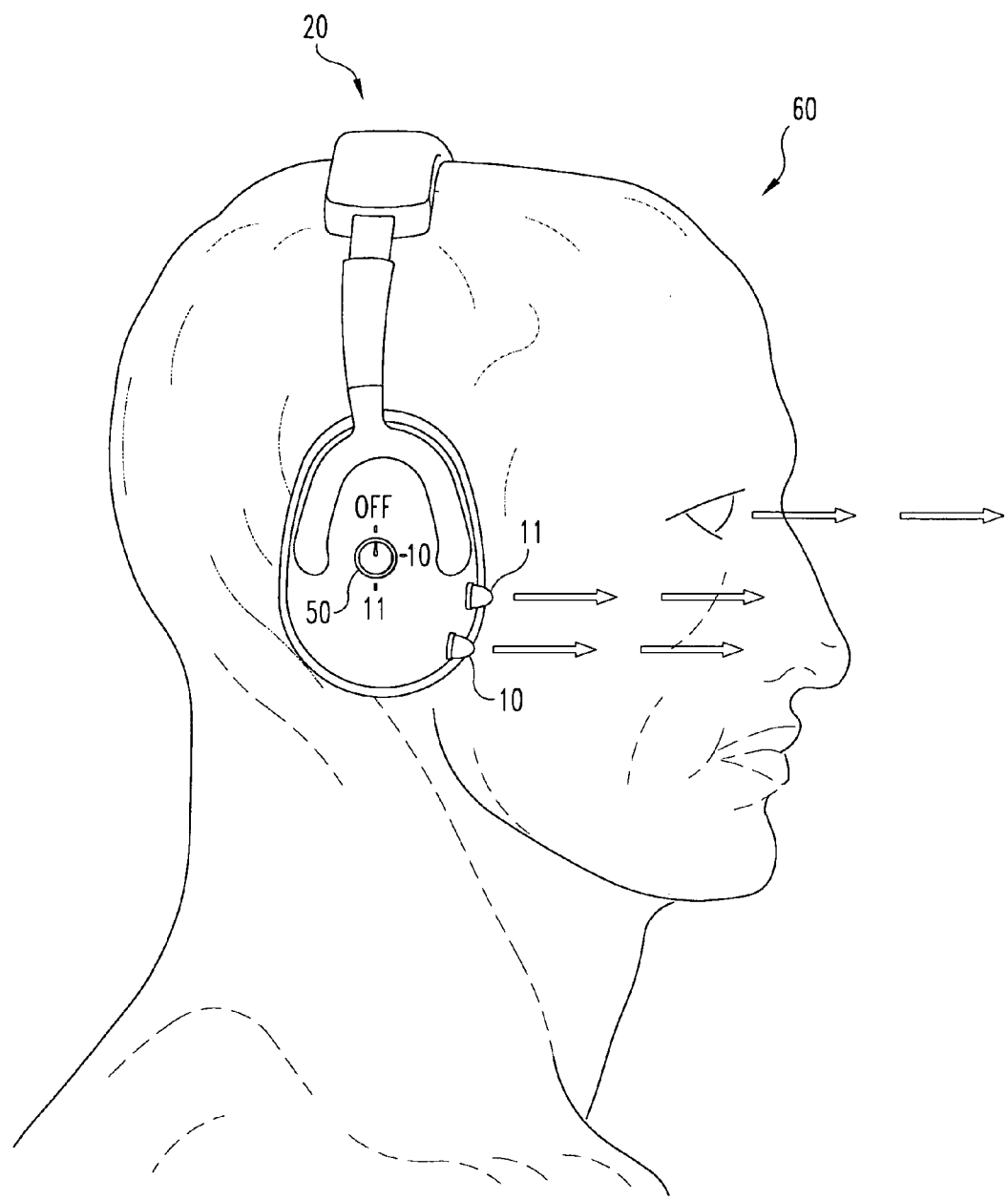
FIG. 4 is a left elevation view of a headset incorporating LEDs and a 3-way switch according to one embodiment of the invention, with a user wearing the headset.

While two toggle-type switches 50 are depicted in the embodiment shown in FIG. 2, one 3-way switch is depicted in the embodiment shown in FIG. 4. The 3-way switch shown in FIG. 4 has three positions: all LEDs off; only first set of LEDs 10 on; and only second set of LEDs 11 on. In a preferred embodiment a 3-way switch is used that meets military specification 13AFWZ1, and is capable of operating at 6 amps at 125 volts. Any switch can be used that is capable of closing a circuit between LEDs 10, 11 and a power source when user 60 desires any of LEDs 10, 11 to illuminate.

Figure 5:
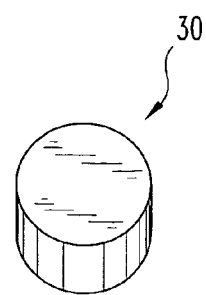
FIG. 5 is an isometric view of a battery according to one embodiment of the invention.
Figure 6:
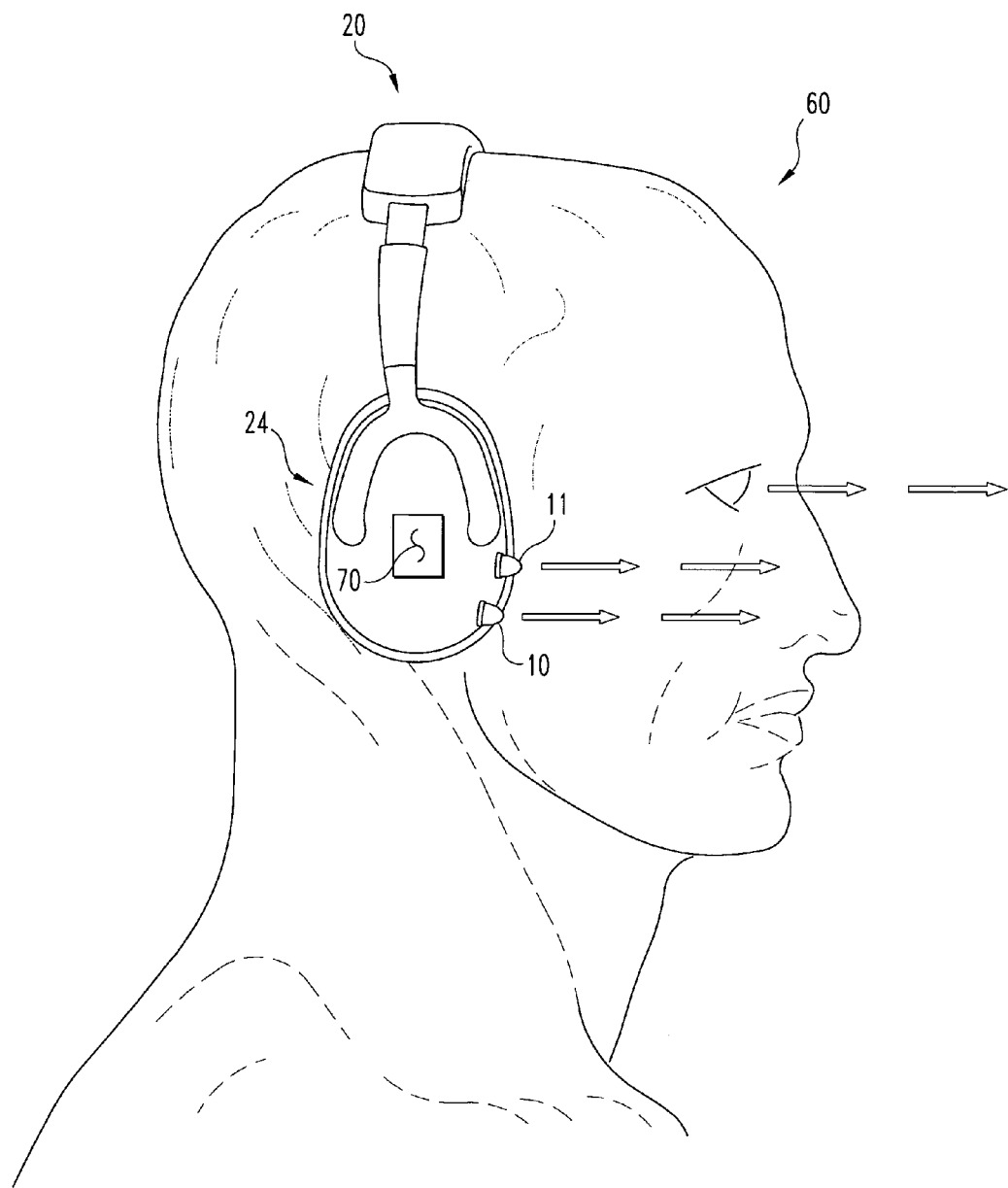
FIG. 6 is a left elevation view of a headset incorporating LEDs and a battery access door according to one embodiment of the invention, with a user wearing the headset.

As discussed above, a cord 40 can extend from ear cup 26 to provide electrical power to LEDs 10, 11 through switch (es) 50. The power source may be, for example, a "hot" outlet such as a jack that receives electrical power from an engine or battery, such as those in an airplane. With such an outlet, one of skill in the art will recognize that cord 40 would be provided with an adaptor (e.g. adaptor 45) to connect to the outlet. Cord 40 may be separate from connection that provide electrical signals to ear cups 24, 26, or may be part of a multi-conductor cable which provides both signals to ear cups 24, 26 and power to LEDs 10, 11. However, the power source may be of any type sufficient to energize LEDs 10, 11. For instance, LEDs 10, 11 may draw power from a battery 30, as shown in FIG. 5. In a preferred embodiment, battery 30 is a Type 23A 12 volt battery, known as a 23-154. The battery 30 is preferably located inside, but may be located outside the headset 20. In other embodiments the cord 40 may provide back-up power in case of failure of battery 30, and/or cord 40 may recharge battery 30. FIG. 6 shows an embodiment with a battery 30 located inside the headset 20. In this embodiment battery access door 70 in ear cup 24 allows access to the battery 30.

Figure 7:
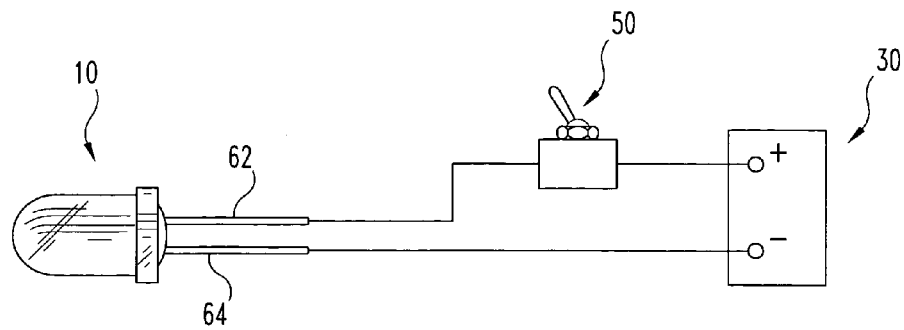
FIG. 7 is diagram of a circuit useful in one embodiment of the invention.

A simple electric circuit useful for the present invention is shown in FIG. 7. The ground terminal 64 of LED 10 is connected with suitable electrical conduit to the negative or ground terminal of a battery 30 or other power source. The positive terminal 62 of LED 10 is connected with suitable electrical conduit to the positive terminal of a battery 30 or other power source through a switch 50. Activating the switch 50 to a first state closes the circuit, turning the LED 10 "on," and activating the switch 50 to a second state opens the circuit, turning the LED 10 "off." It is understood that several LEDs 10 can be connected to a power source (such as a battery 30) through one or more switches 50 serially, or in parallel.

Figure 8:
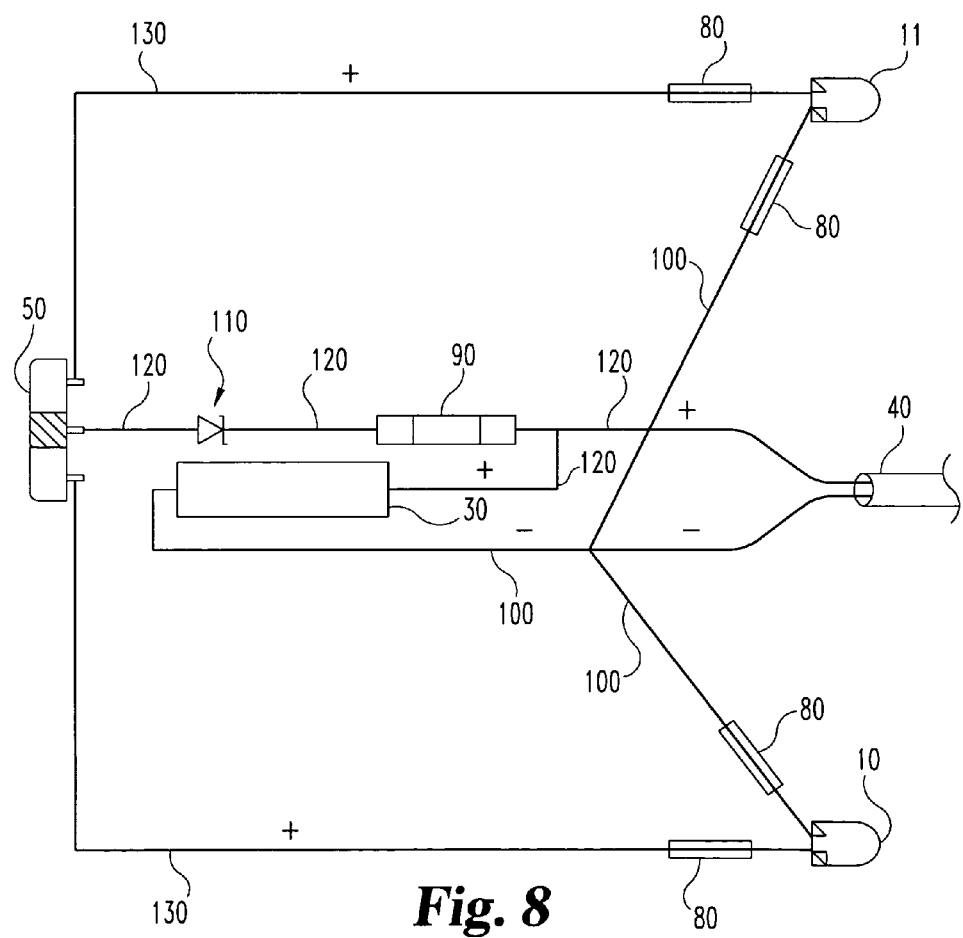
FIG. 8 is diagram of a circuit useful in another embodiment of the invention.

The electrical circuitry of a particular embodiment is shown in FIG. 8. The ground terminals of LEDs 10, 11 are connected to the electrical ground of a battery 30 and the electrical ground of cord 40 with #24 pin clamps 80 and black 24 gauge (AWG) wire 100. The electrically positive terminal of battery 30 and the electrically positive lead of cord 40 are connected to the power terminal of a 3-way switch 50, through a fuse (or circuit breaker) 90 and zener diode 110, using red 24 gauge (AWG) wire 120. The positive terminals of LEDs 10, 11 are connected to first and second terminals, respectively, of 3-way switch 50 with #24 pin clamps 80 and orange 24 gauge (AWG) wire 130. In this embodiment the cord 40 provides back-up and/or recharging power for battery 30. In other embodiments cord 40 or battery 30 may be deleted from the system. It is understood that multiple switches 50, such as toggle switches, may replace 3-way switch 50.

Figure 9C:
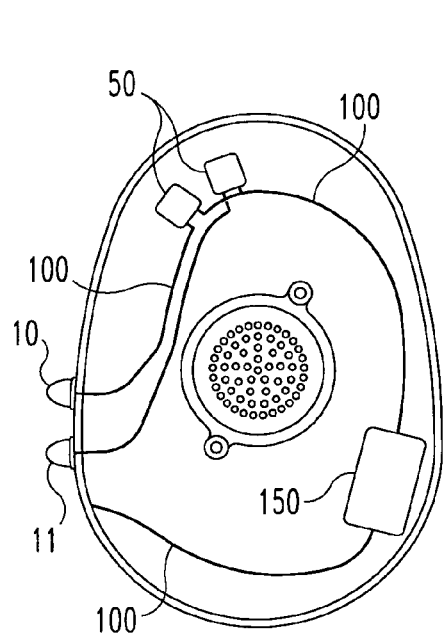
FIG. 9 is an illustration of retrofitting a headset to incorporate LEDs using a kit according to one embodiment of the invention.
Figure 9C:
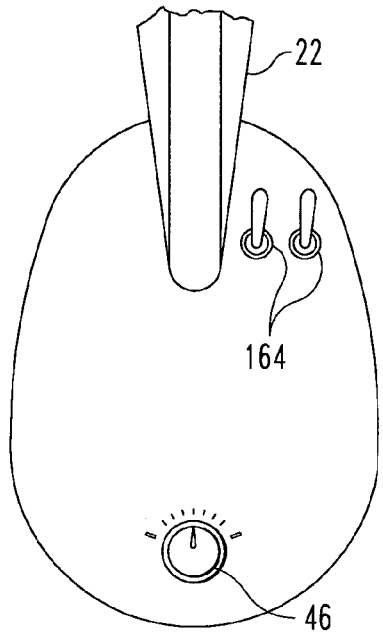
Figure 9C:
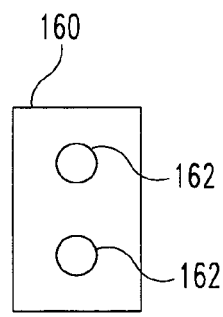
Figure 9E:
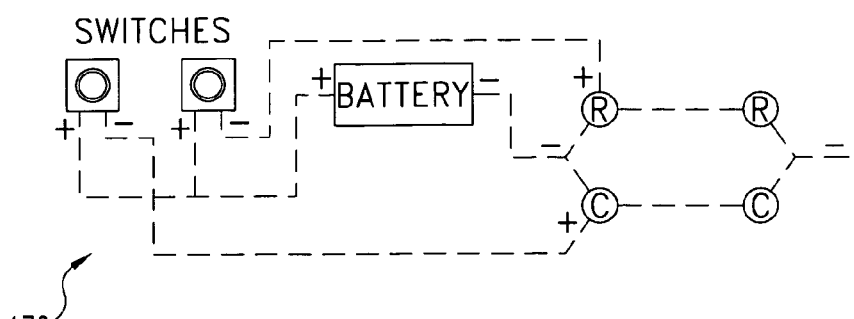
Figure 9B:
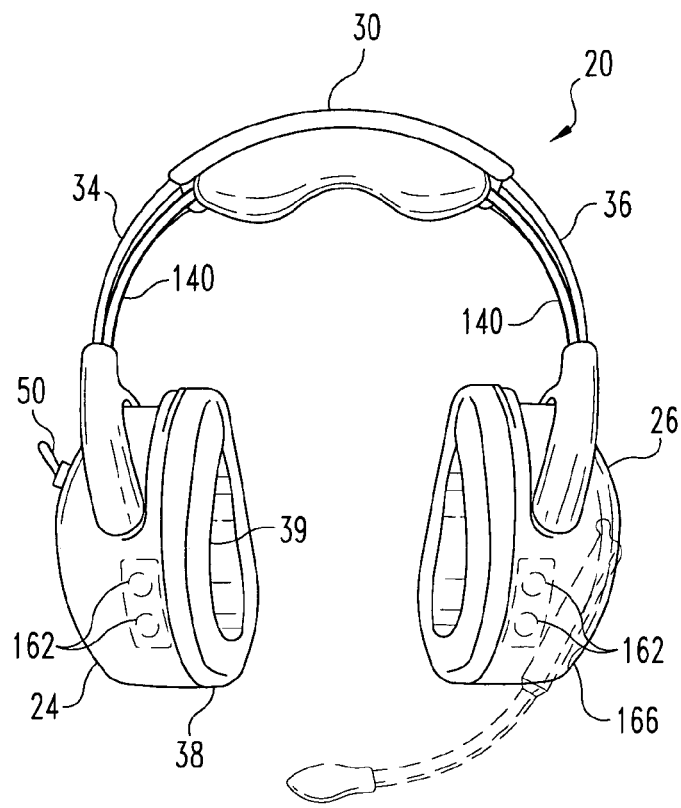

Referring now to FIGS. 9–9A, retrofitting headgear (as an example, an aircraft headset) is shown, using parts in a kit. In one embodiment such a kit includes approximately 12 inches of 24 gauge (AWG) wire 100 (shown in FIG. 9A), two miniature two-way toggle switches 50, two white 1,100 mcd LEDs 10 and two red 3,000 mcd LEDs 11, two rubber boots 140 (shown in FIG. 9B), a battery holder 150, a template 160, and instructions including a circuit diagram 170, illustrating a circuit such as those shown in FIG. 7 or 8.

In this embodiment an LED illumination system is installed by removing ear cups, or acoustic, seals 38, 39 (and any other covering) from ear cups 24, 26, to gain access to the interior of ear cups 24, 26. Templates 160 are then affixed to the forward facing portions of ear cups 24, 26. Per templates 160, two holes 162 (in one embodiment 3/16 inch diameter holes approximately 1/4 inch apart) are drilled in each cup 24, 26. The template 160 is removed after drilling. Two holes 164 are drilled in the side of one ear cup 24 for attachment of switches 50 (in one embodiment 3/16 inch diameter holes approximately 1/2 inch apart). LEDs 10, 11 are installed in holes 162, and switches 50 are installed in holes 164, respectively using bracketry, fasteners, epoxy, molded rubber shapes, or the like (not shown). Battery holder 150 is installed in the interior of cup 24. In embodiments using an outside power source to power LEDs 10, 11, an additional hole 166 is drilled in the bottom of cup 26 for a power cord 40 (in one embodiment a 3/16 inch diameter hole). To protect cord 40, hole 166 may be fitted with a grommet (not shown) that may be supplied with the kit.

Continuing the installation, wire 100 is connected to the battery holder 150, switches 50 and LEDs 10, 11 per the wiring diagram 170. In order to run the wiring 100 from cup 24 to cup 26, the wiring 100 is preferably run along head element 30. To contain the wiring 100 as it runs along head element 30, rubber boots 140 are installed on ear cup supports 34, 36 and over wiring 100. In embodiments utilizing an external power cord 40, the cord 40 is run through hole 166 and attached to wiring 100 and/or battery holder 150 per wiring diagram 170. Various elements of the kit may be attached to headset 20 using fasteners and/or glue, such as epoxy, if desired or necessary. Finally, a battery 30 is installed in battery holder 150, ear cups, or acoustic, seals 38, 39 (and any other covering) are reassembled to ear cups 24, 26. The LEDs 10, 11 of retrofitted headset 20 should then be ready for use by actuating switches 50.

Figure 10:
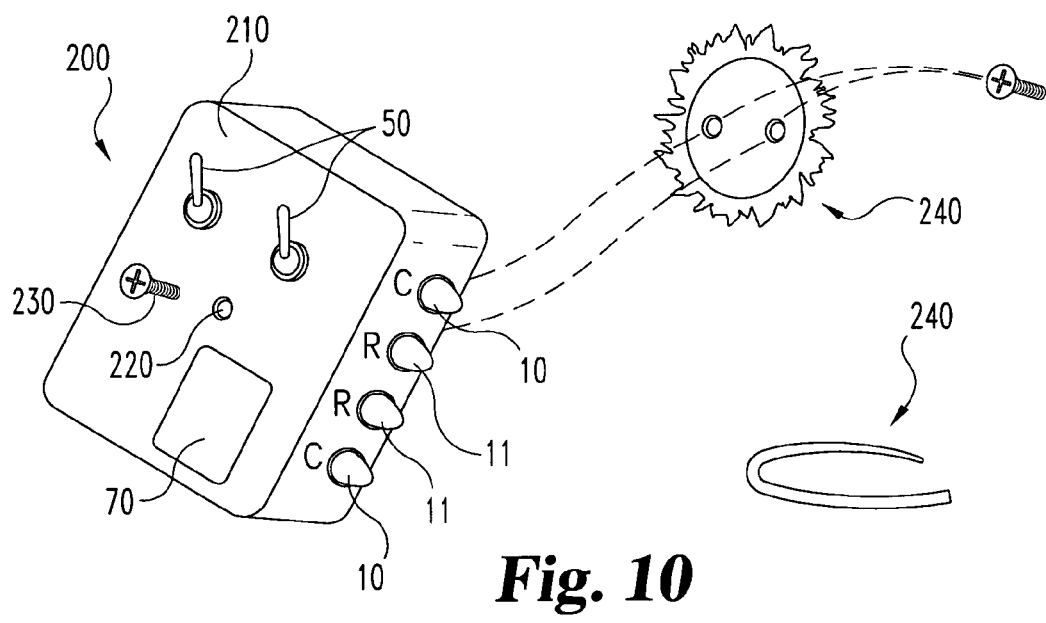
FIG. 10 is an illustration of an add-on device for adding LED illumination to existing headgear.

FIG. 10 shows an embodiment of the general concept of an add-on device 200 for adding LED illumination to existing headgear. Add-on device 200 comprises a housing 210 bearing one or more switches 50, which turn on and off LEDs 10, 11. A battery door 70 is provided in the housing 210 to provide access to a battery 30 (not shown). The electronics/electrical circuit inside housing 210 is similar to that shown in FIGS. 7 and/or 8 (not shown). Housing 210 defines an aperture 220 through which a fastener 230 (in one embodiment, a #2 screw), passes. A portion of fastener 230 that passes through housing 210 attaches to clip 240. Clip 240 may be a spring-loaded clamp, adapted to clamp on to existing headgear, such as an aircraft headset 20. Alternatively, clip 240 may be an integral part of housing 210, or of a portion of housing 210, obviating the need for fastener 220.

Add-on device 200 is utilized by attaching clip 240 to headgear worn by a user such that LEDs 10, 11 are positioned to direct light in the desired direction; manipulating fastener 230 to tighten clip 240 onto headgear, such as headset 20, so that add-on device 200 is not prone to move relative to said headgear; and actuating switch(es) 50 to turn LEDs 10, 11 on and off. In embodiments without fastener 230, the clip 240 may simply be released, allowing the clip 240 to clamp onto said headgear using the preload of the spring in clip 240.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, but not by way of limitation, additional embodiments include providing a compact, lightweight LED flashlight with existing headgear, such as spectacles, hats, helmets, and headbands.

What is claimed is:

1. A headset adapted to provide hands-free illumination for a wearer, comprising:
    a pair of ear cups, each having a shell and at least one speaker within said shell, said shell having an opening for fitting adjacent an ear;
    a band connecting said ear cups and adapted to fit over a wearer's head;
    at least one wire connected at a first place to at least one of said speakers and at a second place to an adaptor, whereby electronic signals can be passed from said adaptor through said wire to said at least one of said speakers;
    at least one light-emitting diode attached to a first of said ear cups, and at least one light-emitting diode attached to a second of said ear cups, said light-emitting diodes being directed so that they can illuminate an area generally along a direction the wearer is looking;
    at least one switch attached to one of said ear cups;
    a power source; and
    conductors connecting said light-emitting diodes, said switch and said power source,
    wherein said light-emitting diodes include a first set of at least one light-emitting diode and a second set of at least one light-emitting diode, and said at least one switch includes an off position, a first on position permitting at least said first diode set to illuminate, and a second on position permitting at least said second diode set to illuminate.

2. The headset of claim 1 wherein said power source is a battery attached inside one of said ear cups.

3. The headset of claim 1 wherein said power source is a hot outlet.

4. The headset of claim 1 wherein said light-emitting diodes include a first set of one or more light-emitting diodes and a second set of one or more light-emitting diodes, and said at least one switch includes a first switch controlling said first diode set, and a second switch controlling said second diode set.

5. The headset of claim 1 wherein each of said ear cups has a plurality of light-emitting diodes attached to said ear cups.

6. The headset of claim 1, wherein said light-emitting diodes have an intensity of from about 1000 millicandelas to about 3000 millicandelas.

7. The headset of claim 1, wherein said at least one light-emitting diode is adapted to emit light having a color from the group consisting of red and white.

8. The headset of claim 1, wherein at least one of said ear cups has a first light-emitting diode and a second light-emitting diode, said first light-emitting diode is adapted to emit white light, and said second light-emitting diode is adapted to emit light of a color other than white.

9. A kit for retrofitting a headset having ear cups for hands-free illumination, comprising:
    a length of wire, at least one switch, a plurality of light-emitting diodes, a battery holder, and a drilling template indicating positions for drilling holes, said drilling template adapted to be placed adjacent to said ear cups,
    wherein said switch, said diodes, and said battery holder are adapted to be fitted on or in said headset, and wherein said wire, said switch, said diodes and said battery holder are adapted to be connected to create a circuit.

10. The kit of claim 9, further comprising a battery adapted to fit in said battery holder.

11. The kit of claim 9, further comprising a circuit diagram according to which said circuit is to be created.

12. A kit for retrofitting a headset having ear cups for hands-free illumination, comprising:
    a length of wire, at least one switch, a plurality of light-emitting diodes, and a battery holder,
    wherein said switch, said diodes, and said battery holder are adapted to be fitted on or in said headset, and wherein said wire, said switch, said diodes and said battery holder are adapted to be connected to create a circuit, and wherein said plurality of light-emitting diodes includes at least two white light-emitting diodes and two red light-emitting diodes.

13. The kit of claim 12, further comprising a battery adapted to fit in said battery holder.

14. The kit of claim 12, further comprising a circuit diagram according to which said circuit is to be created.

15. A method of fitting a headset having ear cups with hands-free illumination, comprising:

drilling a first set of at least one hole in at least one of said ear cups, each of the holes in said first set being of a size adapted to accommodate a light-emitting diode;

drilling a second set of at least one hole in at least one of said ear cups, each of the holes in said second set being of a size adapted to accommodate a switch;

installing at least one light-emitting diode in at least one of the holes in said first set;

installing at least one switch in at least one of the holes in said second set;

connecting one or more conductors between said at least one switch and said at least one light-emitting diode;

providing a power source; and conductively connecting said power source to said at least one switch.

16. The method of claim 15, wherein said providing step includes attaching a battery holder in or on one of said ear cups.

17. The method of claim 15, wherein said providing step includes providing an opening in one of said ear cups, and providing a conductor adapted to be connected to a power source at a distance from said ear cup, and wherein said connecting step includes connecting said conductor through said opening to said at least one switch.

18. The method of claim 15, wherein at least one hole in at least one of said ear cups is positioned so that a light-emitting diode in said hole faces generally forward.

* * * * *